(12) United States Patent
Nampy

(10) Patent No.: US 9,978,354 B2
(45) Date of Patent: May 22, 2018

(54) ACOUSTIC PANEL WITH VERTICAL STIFFENERS

(71) Applicant: Rohr, Inc., Chula Vista, CA (US)

(72) Inventor: Sreenivas Narayanan Nampy, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 7 days.

(21) Appl. No.: 15/130,494

(22) Filed: Apr. 15, 2016

(65) Prior Publication Data

US 2017/0301334 A1    Oct. 19, 2017

(51) Int. Cl.
| | |
|---|---|
| *G10K 11/168* | (2006.01) |
| *F02C 7/24* | (2006.01) |
| *F02K 1/82* | (2006.01) |
| *B64D 29/04* | (2006.01) |
| *B64C 1/40* | (2006.01) |
| *G10K 11/16* | (2006.01) |
| *F02K 1/78* | (2006.01) |
| *B64D 29/00* | (2006.01) |

(52) U.S. Cl.
CPC .............. *G10K 11/168* (2013.01); *F02C 7/24* (2013.01)

(58) Field of Classification Search
CPC .... G10K 11/168; G10K 11/172; F02K 1/827; F02K 1/82; B64D 29/00; B64D 33/02; B64D 33/06; B64D 2033/0206; B64C 1/40
USPC .......................... 181/290, 292, 288, 214, 213
See application file for complete search history.

(56) References Cited

U.S. PATENT DOCUMENTS

| | | | | |
|---|---|---|---|---|
| 2,333,343 A | * | 11/1943 | Sendzimir .............. | B21D 53/00 |
| | | | | 156/197 |
| 3,011,602 A | * | 12/1961 | Ensrud ...................... | E04C 2/32 |
| | | | | 244/123.12 |
| 3,341,395 A | * | 9/1967 | Weber ................... | E04C 2/3405 |
| | | | | 428/134 |

(Continued)

FOREIGN PATENT DOCUMENTS

| | | |
|---|---|---|
| CN | 101649818 | 7/2011 |
| CN | 104723616 | 6/2015 |

(Continued)

OTHER PUBLICATIONS

EP search report for EP17165287.8 dated Jul. 27, 2017.

*Primary Examiner* — Edgardo San Martin
(74) *Attorney, Agent, or Firm* — O'Shea Getz P.C.

(57) ABSTRACT

A panel for attenuating noise includes a core having a first baffle, a second baffle, a first septum, a second septum and a stiffener. The core forms first and second cavities vertically between a first skin and a second skin, wherein the first and the second cavities are each fluidly coupled with perforations in the first skin. The first cavity is formed laterally between the first baffle and the second baffle and has a first cross-sectional geometry. The first septum is laterally between the first baffle and the second baffle and divides the first cavity into fluidly coupled sub-cavities. The second cavity is formed laterally between the second baffle and the stiffener and has a second cross-sectional geometry that is at least approximately identical to the first cross-sectional geometry. The second septum is laterally between the second baffle and the stiffener and divides the second cavity into fluidly coupled sub-cavities.

24 Claims, 11 Drawing Sheets

(56) References Cited

U.S. PATENT DOCUMENTS

| | | | | |
|---|---|---|---|---|
| 3,380,206 A * | 4/1968 | Barnett | | E04B 9/001 181/292 |
| 3,507,355 A * | 4/1970 | Lawson | | E04B 1/86 181/292 |
| 3,542,152 A * | 11/1970 | Oxx, Jr. | | B64D 33/02 181/214 |
| 3,639,106 A | 2/1972 | Yale | | |
| 3,640,357 A * | 2/1972 | Kitching | | F01N 1/24 181/292 |
| 3,734,234 A * | 5/1973 | Wirt | | E04B 1/86 181/286 |
| 3,819,007 A * | 6/1974 | Wirt | | E04B 1/86 181/286 |
| 3,831,710 A * | 8/1974 | Wirt | | G10K 11/172 181/286 |
| 3,848,697 A * | 11/1974 | Jannot | | F02K 1/827 181/220 |
| 3,913,702 A * | 10/1975 | Wirt | | B64D 33/06 181/286 |
| 3,969,563 A * | 7/1976 | Hollis, Sr. | | B32B 3/28 220/62.11 |
| 4,298,090 A * | 11/1981 | Chapman | | F02C 7/24 181/286 |
| 4,828,202 A * | 5/1989 | Jacobs | | B64C 1/06 118/268 |
| 5,635,306 A * | 6/1997 | Minamida | | B21D 47/00 228/181 |
| 6,725,541 B1 * | 4/2004 | Holme | | F02K 1/54 29/889.2 |
| 6,871,725 B2 | 3/2005 | Johnson | | |
| 6,935,834 B2 * | 8/2005 | Lata Perez | | F02C 7/24 415/115 |
| 6,949,282 B2 * | 9/2005 | Obeshaw | | B21C 37/15 138/119 |
| 7,784,283 B2 * | 8/2010 | Yu | | F02K 1/04 181/213 |
| 7,798,285 B2 * | 9/2010 | Chiou | | B64D 33/02 181/204 |
| 7,814,658 B2 * | 10/2010 | Akishev | | B21D 47/00 29/557 |
| 8,079,549 B2 * | 12/2011 | Gouvea | | B29C 66/721 244/119 |
| 8,413,922 B2 * | 4/2013 | Porte | | B64D 15/04 181/214 |
| 8,517,309 B2 * | 8/2013 | Robinson | | B64C 1/12 244/119 |
| 8,733,501 B2 * | 5/2014 | Porte | | F02K 1/827 181/292 |
| 8,763,751 B2 * | 7/2014 | Starobinski | | B64D 33/06 181/213 |
| 8,910,748 B2 * | 12/2014 | Nielsen | | E04B 1/90 181/284 |
| 8,955,643 B2 * | 2/2015 | Liu | | F02C 7/045 181/213 |
| 8,991,054 B2 * | 3/2015 | Porte | | B64D 33/02 29/505 |
| 9,222,229 B1 | 12/2015 | Chang et al. | | |
| 2011/0100747 A1 | 5/2011 | Hoetzeldt et al. | | |
| 2013/0266772 A1 * | 10/2013 | Fujii | | B32B 3/28 428/178 |
| 2014/0349082 A1 | 11/2014 | Tien | | |
| 2015/0110603 A1 | 4/2015 | Biset et al. | | |
| 2015/0129354 A1 * | 5/2015 | Billy | | B60R 13/0815 181/294 |
| 2015/0284945 A1 | 10/2015 | Tien | | |
| 2015/0367953 A1 | 12/2015 | Yu et al. | | |

FOREIGN PATENT DOCUMENTS

| | | | | |
|---|---|---|---|---|
| FR | 2396868 A1 | 2/1979 | | |
| GB | 1406844 | 9/1975 | | |
| GB | 2089434 A * | 6/1982 | | F02K 1/82 |
| RU | 2413654 | 6/2010 | | |

* cited by examiner

ACOUSTIC PANEL WITH VERTICAL STIFFENERS

BACKGROUND OF THE INVENTION

1. Technical Field

This disclosure relates generally to noise attenuation and, more particularly, to an acoustic panel for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide such a panel with the same or more structural integrity than previous acoustic panels.

SUMMARY OF THE DISCLOSURE

According to an aspect of the present disclosure, a panel is provided for attenuating noise. This panel includes a first skin, a second skin and a core. The core includes a first baffle, a second baffle, a first septum, a second septum and a stiffener. The core forms first and second cavities vertically between the first skin and the second skin, wherein the first and the second cavities are each fluidly coupled with perforations in the first skin. The first cavity is formed laterally between the first baffle and the second baffle and has a first cross-sectional geometry. The first septum is laterally between the first baffle and the second baffle and divides the first cavity into fluidly coupled sub-cavities. The second cavity is formed laterally between the second baffle and the stiffener and has a second cross-sectional geometry that is at least approximately identical to the first cross-sectional geometry. The second septum is laterally between the second baffle and the stiffener and divides the second cavity into fluidly coupled sub-cavities.

According to another aspect of the present disclosure, another panel is provided for attenuating noise. This panel includes a first skin, a second skin and a core. One of the first skin and the second skin is perforated. The core includes a corrugation and a stiffener and forms a plurality of cavities vertically between the first skin and the second skin. The corrugation includes a first baffle and a first septum. The stiffener includes a first wall and a second wall. A first of the cavities is formed laterally between the first baffle and the first wall. The first septum is laterally between the first baffle and the first wall and divides the first of the cavities into fluidly coupled sub-cavities. A second of the cavities is formed laterally between the first wall and the second wall. The first baffle is connected to and offset from the first skin by an acute first angle. The first wall is connected to and offset from the first skin by an acute second angle that is substantially equal to the first angle. The first septum is connected to and offset from the first skin by a third angle. The second wall is connected to and offset from the first skin by a fourth angle that is substantially equal to the third angle. A stiffness of the stiffener is greater than a stiffness of the corrugation.

According to still another aspect of the present disclosure, another panel is provided for attenuating noise. This panel includes a first skin, a second skin and a core. One of the first skin and the second skin is perforated. The core includes a corrugation and a stiffener and forms a plurality of cavities vertically between the first skin and the second skin. The corrugation includes a first baffle and a first septum. The stiffener includes a first wall and a second wall. A first of the cavities is formed laterally between the first baffle and the first wall. The first septum is laterally between the first baffle and the first wall and divides the first of the cavities into fluidly coupled sub-cavities. The first baffle is connected to and offset from the first skin by an acute first angle. The first wall is connected to and offset from the first skin by an acute second angle that is substantially equal to the first angle. The first septum is connected to and offset from the first skin by a third angle. The second wall is connected to and offset from the first skin by a fourth angle that is substantially equal to the third angle. The first baffle has a first thickness and the first wall has a second thickness that is greater than the first thickness.

The first baffle may have a first thickness. The first wall may have a second thickness that is greater than the first thickness.

The corrugation may be configured from or otherwise include a first material. The stiffener may be configured from or otherwise include a second material that is different than the first material.

The second of the cavities may have a cross-sectional geometry that is approximately identical to a cross-sectional geometry of at least one of the sub-cavities.

The core may include a second corrugation including a second baffle and a second septum. A third of the cavities may be formed laterally between the second baffle and the second wall. The second septum may be laterally between the second baffle and the second wall and divides the third of the cavities into fluidly coupled sub-cavities. The second baffle may be connected to and offset from the first skin by an acute fifth angle that is substantially equal to the first angle. The second septum may be connected to and offset from the first skin by a sixth angle that is substantially equal to the third angle.

The second cavity may be formed laterally between the second baffle and a wall of the stiffener. The first baffle and the second baffle may each have a first vertical stiffness. The wall may have a second vertical stiffness that is greater than the first vertical stiffness.

The second cavity may be formed laterally between the second baffle and a wall of the stiffener. The first baffle and the second baffle may each have a first thickness. The wall may have a second thickness that is greater than the first thickness.

The first baffle and the second baffle may each be configured from or otherwise include a first material. The stiffener may be configured from or otherwise include a second material that is different than the first material.

The first septum and the second septum may each be configured from or otherwise include the first material.

The stiffener may include a first wall and a second wall. The second cavity may be forming laterally between the second baffle and the first wall. A third cavity may be formed vertically between the first skin and the second skin and laterally between the first wall and the second wall.

The third cavity may have a third cross-sectional geometry that is approximately identical to a cross-sectional geometry of at least one of the sub-cavities.

The third cavity may be fluidly coupled with one or more perforations in the first skin.

The second baffle may be offset from the first skin by an acute first angle. The first wall may be offset from the first skin by an acute second angle that is substantially equal to the first angle. The second septum may be offset from the first skin by a third angle. The second wall may be offset from the first skin by a fourth angle that is substantially equal to the third angle.

The third angle and fourth angle may be acute angles.

The third angle and fourth angle may be right angles.

The core may include a third baffle and a third septum. A third cavity may be formed vertically between the first skin and the second skin and laterally between the third baffle and the stiffener. The third cavity may have a third cross-sectional geometry that is approximately identical to the first cross-sectional geometry.

The first baffle, the second baffle, the first septum, the second septum and the stiffener may each be connected to and extend vertically between the first skin and the second skin.

The panel may be configured as a component of an aircraft propulsion system.

The first wall may be perforated. Alternatively, the second wall may be perforated.

The foregoing features and the operation of the invention will become more apparent in light of the following description and the accompanying drawings.

DETAILED DESCRIPTION OF THE INVENTION

Figure 1:
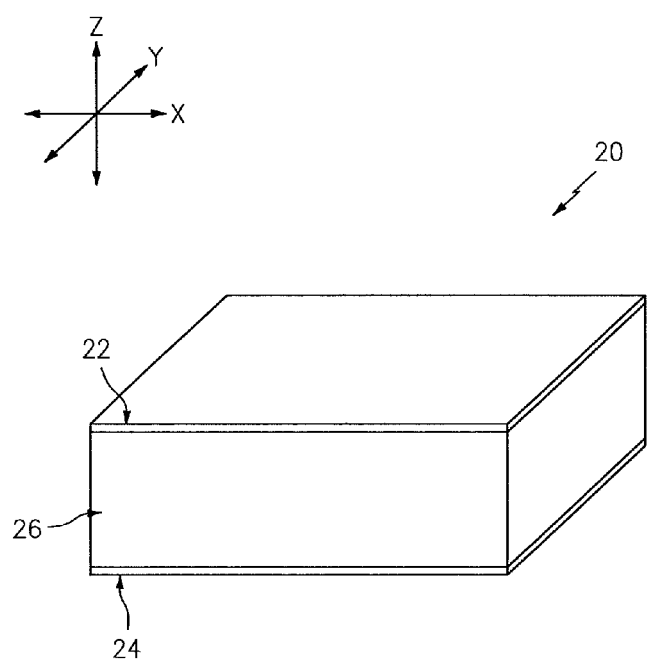
FIG. 1 is a partial, perspective block diagram illustration of a structural, acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve of a thrust reverser, a component that needs acoustic treatment, a blocker door for a thrust reverser, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends laterally along an x-axis. The acoustic panel 20 extends longitudinally along a y-axis. The acoustic panel 20 extends vertically along a z-axis. Note, the term "vertical" is used herein to describe a depth-wise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be flat, arcuate, cylindrical or conical with or without radial undulations. Thus, the vertical direction may change at different locations along the x-y plane; e.g., the vertical direction may be a radial direction for a cylindrical or conical acoustic panel.

The acoustic panel 20 includes a perforated first (e.g., face) skin 22, a solid, non-perforated second (e.g., back) skin 24 and a cellular core 26. Briefly, the cellular core 26 is disposed and extends vertically between the first skin 22 and the second skin 24. The cellular core 26 is also connected to the first skin 22 and the second skin 24. The cellular core 26, for example, may be welded, brazed, fused, adhered or otherwise bonded to the first skin 22 and/or the second skin 24. The cellular core 26 may also and/or alternatively be mechanically fastened to the first skin 22 and/or the second skin 24. Alternatively, the cellular core 26 may be formed integral with the first skin 22 and/or the second skin 24 as a monolithic body using, for example, additive manufacturing. However, the present disclosure is not limited to any particular manufacturing methods.

Figure 2:
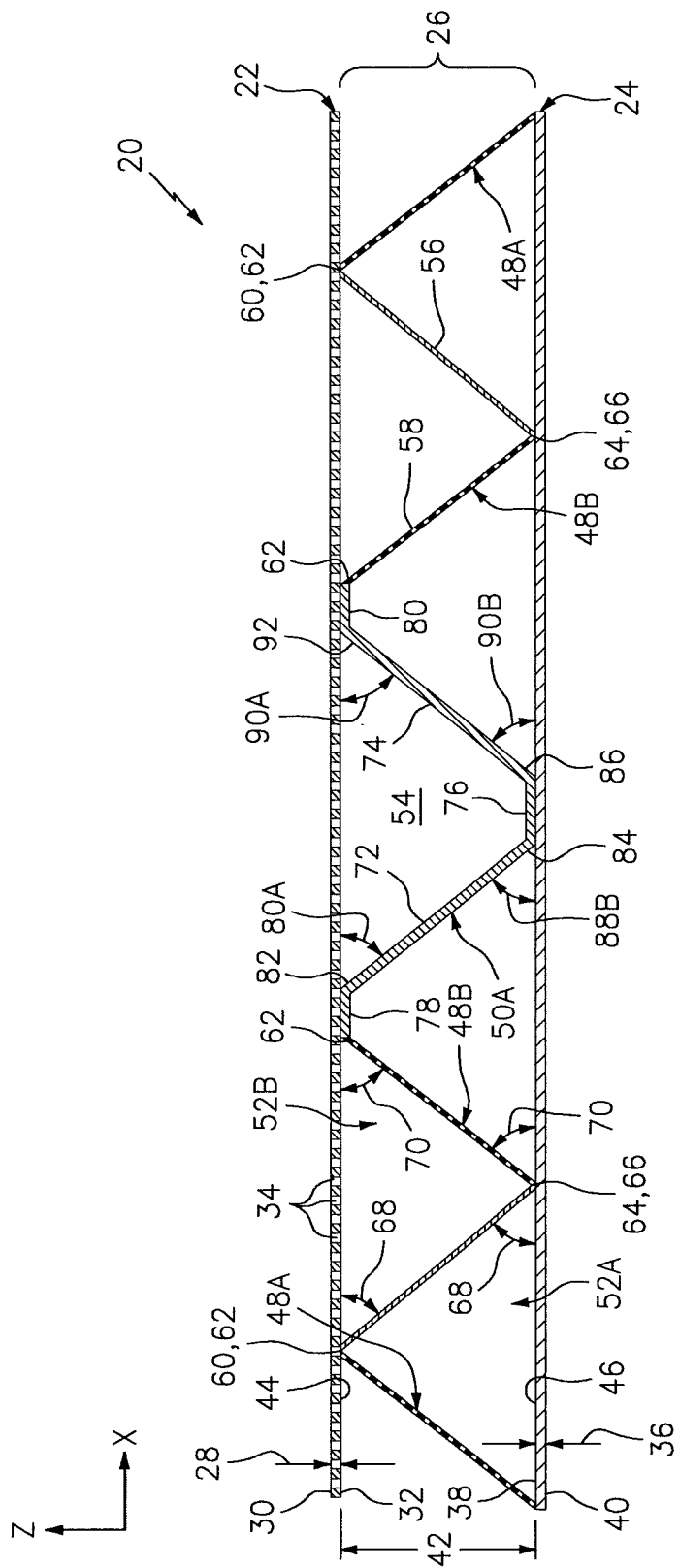
FIG. 2 is a sectional illustration of a portion of the acoustic panel taken in an x-z plane.

The first skin 22 may be configured as a relatively thin sheet or layer of material that extends laterally and longitudinally along the x-y plane. This first skin 22 material may include, but is not limited to, a metal, a polymer, a fiber reinforced composite (e.g., fiberglass composite, carbon fiber composite, aramid fiber composite, chopped fiber composite, particulate infused matrix, etc.), or a combination thereof. Referring now to FIG. 2, the first skin 22 has a vertical thickness 28, which extends vertically between opposing side surfaces 30 and 32. The first skin 22 includes a plurality of perforations 34; e.g., apertures such as through-holes. Each of these perforations 34 extends generally vertically through the first skin 22 between its side surfaces 30 and 32.

The second skin 24 may be configured as a relatively thin sheet or layer of (e.g., continuous and uninterrupted) material that extends laterally and longitudinally along the x-y plane (see FIG. 1). This second skin 24 material may include, but is not limited to, a metal, a polymer, a fiber reinforced composite (e.g., fiberglass composite, carbon fiber composite, aramid fiber composite, etc.), or a combination thereof. The second skin 24 material may be the same as or different than the first skin 22 material. The second skin 24 has a vertical thickness 36, which extends vertically between opposing side surfaces 38 and 40. This vertical thickness 36 may be substantially equal to or different (e.g., greater or less) than the vertical thickness 28 of the first skin 22.

Figure 3:
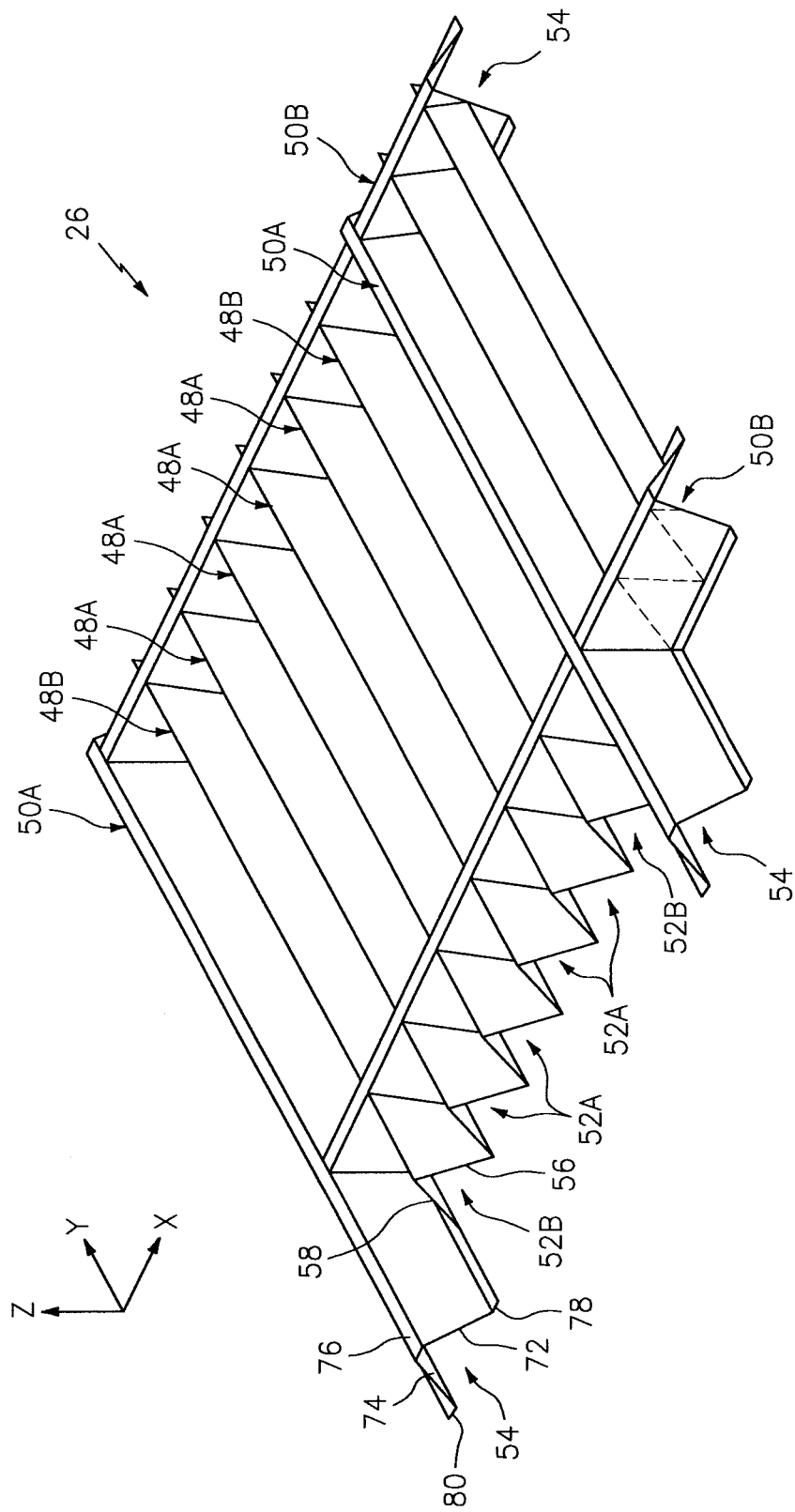
FIG. 3 is a perspective illustration of a portion of a cellular core for the acoustic panel.

Referring to FIG. 3, the cellular core 26 extends laterally and longitudinally along the x-y plane. Referring again to FIG. 2, the cellular core 26 has a vertical thickness 42, which extends vertically between opposing core sides 44 and 46 respectively abutted against the first skin 22 and the second skin 24. The vertical thickness 42 may be substantially greater than the vertical thickness 28, 36 of first skin 22 and/or the second skin 24. The vertical thickness 42, for example, may be at least ten to forty times (10-40×), or more, greater than the vertical thickness 28, 36; however, the acoustic panel 20 of the present disclosure is not limited to such an exemplary embodiment.

Referring to FIGS. 2 and 3, the cellular core 26 includes one or more corrugations 48A and 48B (generally referred to as "48") and one or more stiffeners 50A and 50B (generally referred to as "50"). The components are arranged together to configure the cellular core 26 as an open cavity (e.g., open cell) structure. This open cavity structure forms a plurality of cavities 52A and 52B (generally referred to as "52") and 54 vertically between the first skin 22 and the second skin 24.

The corrugations 48 of FIG. 3 are arranged in a plurality of arrays. Laterally or longitudinally adjacent arrays are separated by a respective one of the stiffeners 50A. Each of these arrays includes one or more intermediate corrugations 48A and a pair of opposing end corrugations 48B. The term "intermediate corrugation" may be used to describe a corrugation disposed laterally between and adjacent to two other corrugations. The term "end corrugation" may be used to describe a corrugation disposed laterally between and adjacent to another corrugation and a stiffener (or another structural element such as a panel endwall).

Each of the corrugations 48 extends longitudinally between two of the stiffeners 50B, or between one of the stiffeners 50B and another structural element such as a panel endwall. Each of the corrugations 48 of FIGS. 2 and 3 includes a baffle 56 and a septum 58. Of course, in other embodiments, one or more of the corrugations 48 may also each include an additional element (e.g., a bridge) and/or have a longitudinal gap between the respective baffle 56 and septum 58.

Referring to FIG. 2, a top end 60 of the baffle 56 is connected to or otherwise engaged with the first skin 22. In the case of an intermediate corrugation 48A, the top end 60 is laterally connected to a top end 62 of a septum 58 of an adjacent one of the corrugations 48. Alternatively, in the case of an end corrugation 48B, the top end 60 is laterally connected to an adjacent one of the stiffeners 50A (or another structural element such as a panel endwall).

An opposing bottom end 64 of the baffle 56 is connected to or otherwise engaged with the second skin 24. This bottom end 64 is also laterally connected to a bottom end 66 of the septum 58. The baffle 56 therefore extends vertically between the first skin 22 and the second skin 24. The baffle 56 is also angularly offset from the first skin 22 and the second skin 24 by an included angle 68 (e.g., an acute angle) such as, but not limited to, about forty-five degrees (45°). Note, the terms "top" and "bottom" are used above to describe ends of the baffle 56 as situated in the drawings and are not intended to limit the baffle 56 or the acoustic panel 20 to such an exemplary gravitational orientation.

The top end 62 of the septum 58 is connected to or otherwise engaged with the first skin 22. In the case of an intermediate corrugation 48A, the top end 62 is laterally connected to the top end 60 of a baffle 56 of an adjacent one of the corrugations 48. Alternatively, in the case of an end corrugation 48B, the top end 62 is laterally connected to an adjacent one of the stiffeners 50A (or another structural element such as a panel endwall).

The opposing bottom end 66 of the septum 58 is connected to or otherwise engaged with the second skin 24. The septum 58 therefore extends vertically between the first skin 22 and the second skin 24. The septum 58 is also angularly offset from the first skin 22 and the second skin 24 by an included angle 70. This angle 70 may be an acute angle such as, but not limited to, about forty-five degrees (45°). The angle 70 may be substantially equal to the angle 68 as shown in FIG. 2. However, in other embodiments, the angle 70 may be greater than or less than the angle. Note, the terms "top" and "bottom" are used above to describe ends of the septum 58 as situated in the drawings and are not intended to limit the septum 58 or the acoustic panel 20 to such an exemplary gravitational orientation.

Referring to FIG. 3, each of the stiffeners 50A extends longitudinally between opposing ends. Each of the stiffeners 50A of FIGS. 2 and 3 includes a stiffener first wall 72 and a stiffener second wall 74. Each of these stiffeners 50A also includes a bridge 76 and one or more flanges 78 and 80. Of course, in other embodiments, one or more of the stiffeners 50A may include one or more additional elements or omit one or more of the elements as described below in further detail.

Referring to FIG. 2, a top end 82 of the first wall 72 is connected to a proximal end of the first flange 78, which first flange 78 is connected to or otherwise engaged with the first skin 22. An opposing distal end of the first flange 78 is also connected to or otherwise engaged with the top end 62 of a septum 58 of an adjacent one of the corrugations 48B. The first flange 78 of FIG. 2 thereby connects the top end 82 of the first wall 72 to the first skin 22 and/or the adjacent corrugation 48B. However, in other embodiments, the top end 82 of the first wall 72 may be directly connected to the first skin 22 and/or the adjacent corrugation 48B where, for example, the first flange 78 is omitted.

A bottom end 84 of the first wall 72 is connected to a first end of the bridge 76, which bridge 76 is connected to or otherwise engaged with the second skin 24. An opposing second end of the bridge 76 is also connected to or otherwise engaged with a bottom end 86 of the second wall 74. The bridge 76 of FIG. 2 thereby connects the bottom end 84 of the first wall 72 to the second skin 24 and/or the bottom end 86 of the second wall 74. However, in other embodiments, the bottom end 84 of the first wall 72 may be directly connected to the second skin 24 and/or the bottom end 86 of the second wall 74 where, for example, the bridge 76 is omitted.

With the foregoing configuration, the first wall 72 extends radially and laterally between the first flange 78 and the bridge 76. The first wall 72 is also angularly offset from the first skin 22 by an included angle 88A and from the second skin 24 by another included angle 88B. Each angle 88A, 88B may be an acute angle such as, but not limited to, about forty-five degrees (45°). Each angle 88A, 88B may also be substantially equal to the angle 68, 70 as shown in FIG. 2. However, in other embodiments, one or more of the angles 88A and/or 88B may each be greater than or less than the angle 68 and/or 70. Note, the terms "top" and "bottom" are used above to describe ends of the first wall 72 as situated in the drawings and are not intended to limit the first wall 72 or the acoustic panel 20 to such an exemplary gravitational orientation.

A top end 92 of the second wall 74 is connected to a proximal end of the second flange 80, which second flange 80 is connected to or otherwise engaged with the first skin 22. An opposing distal end of the second flange 80 may also be connected to or otherwise engaged with the top end 62 of a septum 58 of an adjacent one of the corrugations 48B. The second flange 80 of FIG. 2 thereby connects the top end 92 of the second wall 74 to the first skin 22 and/or the adjacent corrugation 48B. However, in other embodiments, the top end 92 of the second wall 74 may be directly connected to the first skin 22 and/or the adjacent corrugation 48B where, for example, the second flange 80 is omitted.

The bottom end 86 of the second wall 74 is connected to the second end of the bridge 76. The opposing first end of the bridge 76 is also connected to or otherwise engaged with the bottom end 84 of the first wall 72. The bridge 76 of FIG. 2 thereby connects the bottom end 86 of the second wall 74 to the second skin 24 and/or the bottom end 84 of the first wall 72. However, in other embodiments as indicated above, the bottom end 86 of the second wall 74 may be directly connected to the second skin 24 and/or the bottom end 84 of the first wall 72 where, for example, the bridge 76 is omitted.

With the foregoing configuration, the second wall 74 extends radially and laterally between the second flange 80 and the bridge 76. The second wall 74 is also angularly offset from the first skin 22 by an included angle 90A and from the second skin 24 by another included angle 90B. Each angle 90A, 90B may be an acute angle such as, but not limited to, about forty-five degrees (45°). Each angle 90A, 90B may also be substantially equal to the angle 88A, 88B as shown in FIG. 2. However, in other embodiments, one or more of the angles 90A and/or 90B may each be greater than or less than the angle 88A and/or 88B. Note, the terms "top" and "bottom" are used above to describe ends of the second wall 74 as situated in the drawings and are not intended to limit the second wall 74 or the acoustic panel 20 to such an exemplary gravitational orientation.

Figure 4:
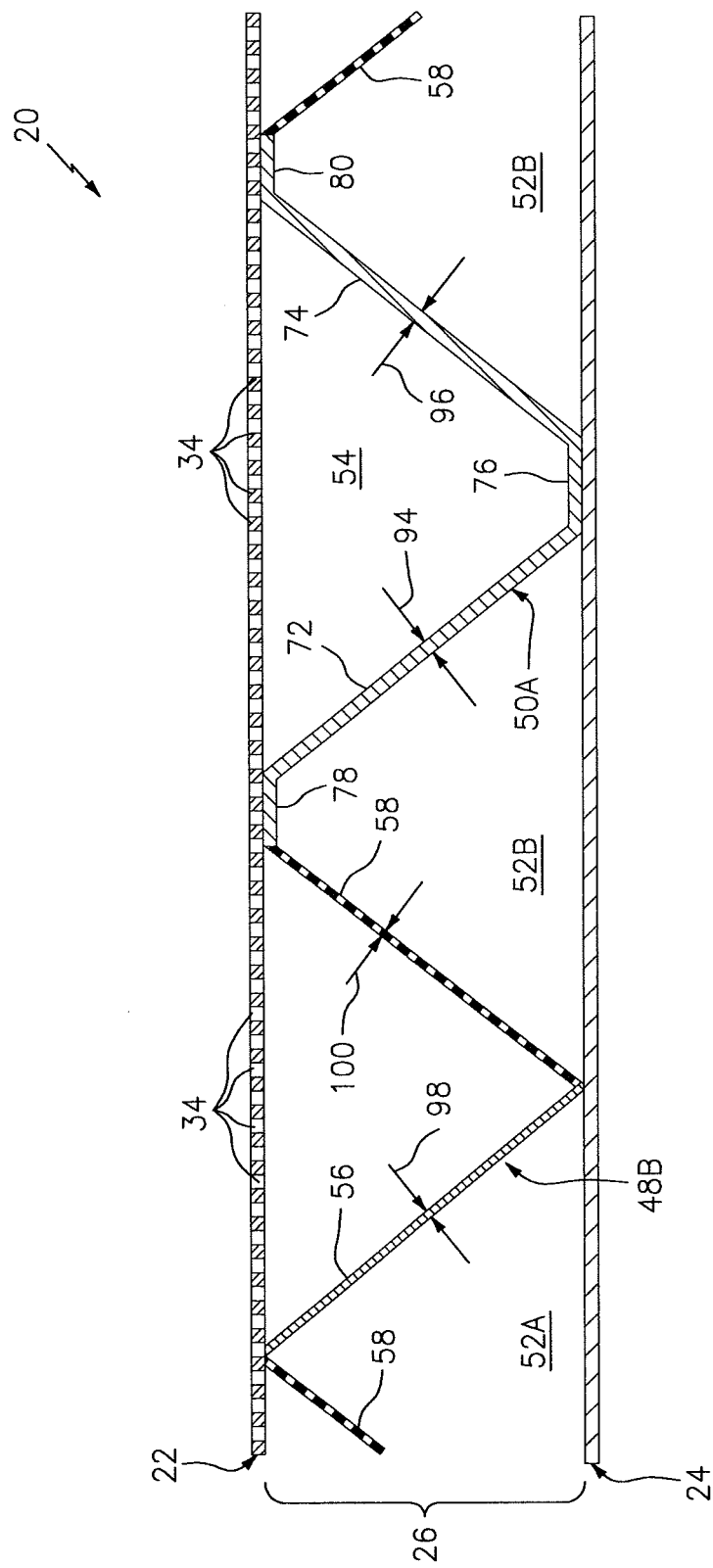
FIG. 4 is a sectional illustration of another portion of the acoustic panel taken in an x-z plane.

Referring to FIG. 4, each of the stiffeners 50A is configured to have a stiffness at least in the vertical direction (e.g., a vertical stiffness) that is greater than a corresponding stiffness of each corrugation 48. For example, each wall 72, 74 may be configured to have a vertical stiffness that is greater than a vertical stiffness of the baffle 56 and/or a vertical stiffness of the septum 58. In this manner, the stiffeners 50A are operable to increase the vertical stiffness and rigidity of the acoustic panel 20.

To provide a greater stiffness as described above, each of the stiffener walls 72 and 74 may be configured with a thickness 94, 96 that is greater than a thickness 98 of the baffle 56 and/or a thickness 100 of the septum 58, where the thicknesses 94 and 96 may be substantially equal to or different from one another. In addition or alternatively, the stiffener 50A may be constructed from a stiffer material or a stiffer design (aka geometry) than the corrugation 48. The stiffener 50A, for example, may be constructed from a metal whereas the corrugation 48 may be constructed from a polymer or composite. Of course, one or more other techniques may also or alternatively be employed to increase the stiffness of the stiffeners 50A relative to the corrugations 48 and the present disclosure is not limited to any particular ones thereof; e.g., one or more of the stiffener walls 72, 74 may be corrugated. In addition, the components 48, 50 of the acoustic panel 20 are not limited to being constructed from the exemplary materials described above. For example, one or more of these components 48, 50 may each be constructed from a metal, a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. The material(s) used to construct some or all of the stiffener 50 may be the same or different than the material(s) used to construct some or all of the corrugations 48, the first skin 22 and/or the second skin 24.

Referring to FIG. 3, each of the stiffeners 50B may have a similar configuration to that described above with respect to the stiffeners 50A. However, whereas a length of each stiffener 50A extends longitudinally, the orientation of the stiffeners 50B is rotated such that a length of each stiffener 50B extends laterally (or another direction). Of course, in other embodiments, one or more of the stiffeners 50B may each have a different configurations than that of the stiffeners 50A. In still other embodiments, one or more of the stiffeners 50B may be configured as a single solid wall that is substantially perpendicular to the first skin 22 and the second skin 24, etc.

Figure 5:
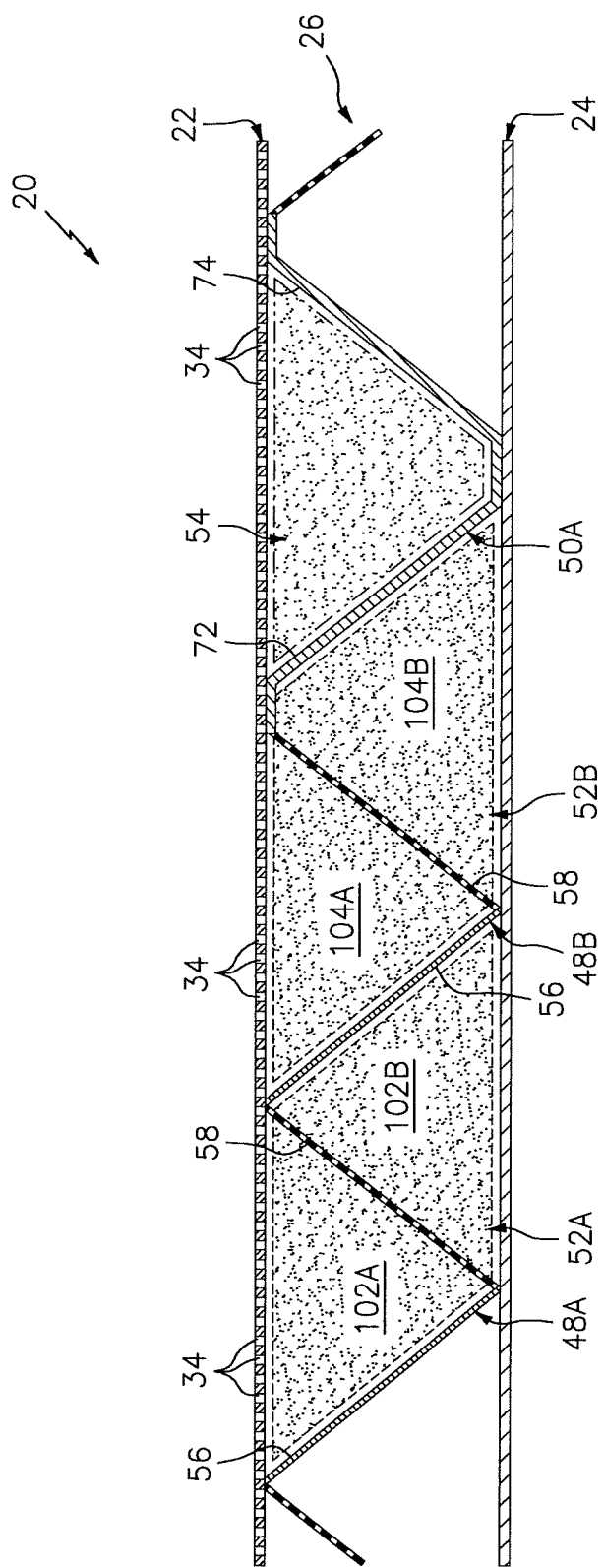
FIG. 5 is a sectional illustration of the acoustic panel portion of FIG. 2 with shaded areas showing cavities within the cellular core.
Figure 6:
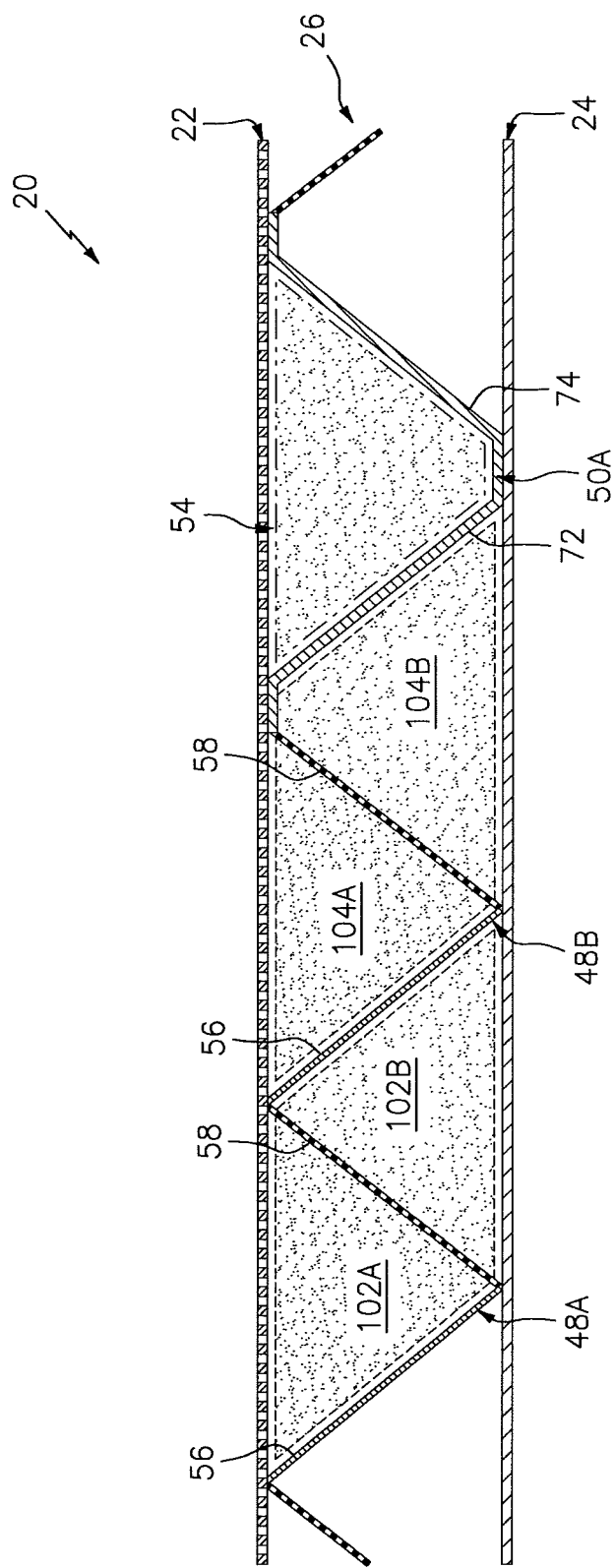
FIG. 6 is a sectional illustration of the acoustic panel portion of FIG. 2 with shaded areas showing sub-cavities and cavities within the cellular core.

Referring to FIG. 5, the cavities 52 may be grouped into intermediate cavities 52A and end cavities 52B. Each intermediate cavity 52A extends laterally between and is formed by a laterally adjacent pair of the baffles 56. Each intermediate cavity 52A has a cross-sectional geometry. A respective one of the septums 58 is disposed within and divides the intermediate cavity 52A into fluidly coupled sub-cavities 102A and 102B (generally referred to as "102"). The first sub-cavity 102A has a cross-sectional geometry that may be identical to a cross-sectional geometry of the second sub-cavity 102B as shown in FIG. 6. For example, a shape and dimensions of the cross-sectional geometry of the first sub-cavity 102A may be the same as a shape and dimensions of the cross-sectional geometry of the second sub-cavity 102B. Of course, in other embodiments, the cross-sectional geometry of the first sub-cavity 102A may alternatively be different than the cross-sectional geometry of the second sub-cavity 102B.

Referring to FIG. 5, each end cavity 52B extends laterally between and is formed by a respective one of the baffles 56 and a laterally adjacent one of the stiffener 50A (or another structural element such as a panel endwall). More particularly, each end cavity 52B of FIG. 5 extends laterally between and is formed by a respective one of the baffles 56 and a laterally adjacent one of the first or second walls 72, 74. Each end cavity 52B has a cross-sectional geometry, which may be at least substantially identical to the cross-sectional geometry of at least one of the intermediate cavities 52A. For example, a shape and dimensions of the cross-sectional geometry of the end cavity 52B of FIG. 5 is substantially the same as (a close approximation to) a shape and dimensions of the cross-sectional geometry of the intermediate cavity 52A.

A respective one of the septums 58 is disposed within and divides the end cavity 52B into fluidly coupled sub-cavities 104A and 104B (generally referred to as "104"). The first sub-cavity 104A has a cross-sectional geometry that may be substantially identical to a cross-sectional geometry of the second sub-cavity 104B as shown in FIG. 6. For example, a shape and dimensions of the cross-sectional geometry of the first sub-cavity 104A may be substantially the same as (a close approximation to) a shape and dimensions of the cross-sectional geometry of the second sub-cavity 104B. The cross-sectional geometry of each sub-cavity 104 may also be substantially identical to the cross-sectional geometry of each sub-cavity 102.

Referring to FIG. 5, each cavity 54 extends laterally between and is formed by the first wall 72 and the second wall 74 of a respective one of the stiffeners 50A. Each cavity 54 has a cross-sectional geometry, which may be at least substantially identical to the cross-sectional geometry of at least one of the sub-cavities 102, 104. For example, a shape and dimensions of the cross-sectional geometry of the cavity 54 of FIG. 6 is substantially the same as (a close approximation to) a shape and dimensions of the cross-sectional geometry of the sub-cavity 102A, 102B, 104A and/or 104B.

With the foregoing cellular core 26 configuration of FIG. 5, each of the cavities 52 and 54 forms a resonance chamber. A length of the resonance chamber associated with the cavities 52 extends diagonally between the first skin 22 and the second skin 24 and through a respective one of the septums 58. This enables noise attenuation of relatively low frequency noise without increasing the vertical thickness 42 (see FIG. 2) of the cellular core 26 and, thus, an overall vertical thickness of the acoustic panel 20. For example, each resonance chamber may receive noise waves through the perforations 34 in the first skin 22. The resonance chamber may reverse the phase of one or more frequencies of those sound waves using known acoustic reflection principles and subsequently direct the reverse phase sound waves out of the acoustic panel 20 through the perforations 34 to destructively interfere with other incoming noise waves.

Figure 7:
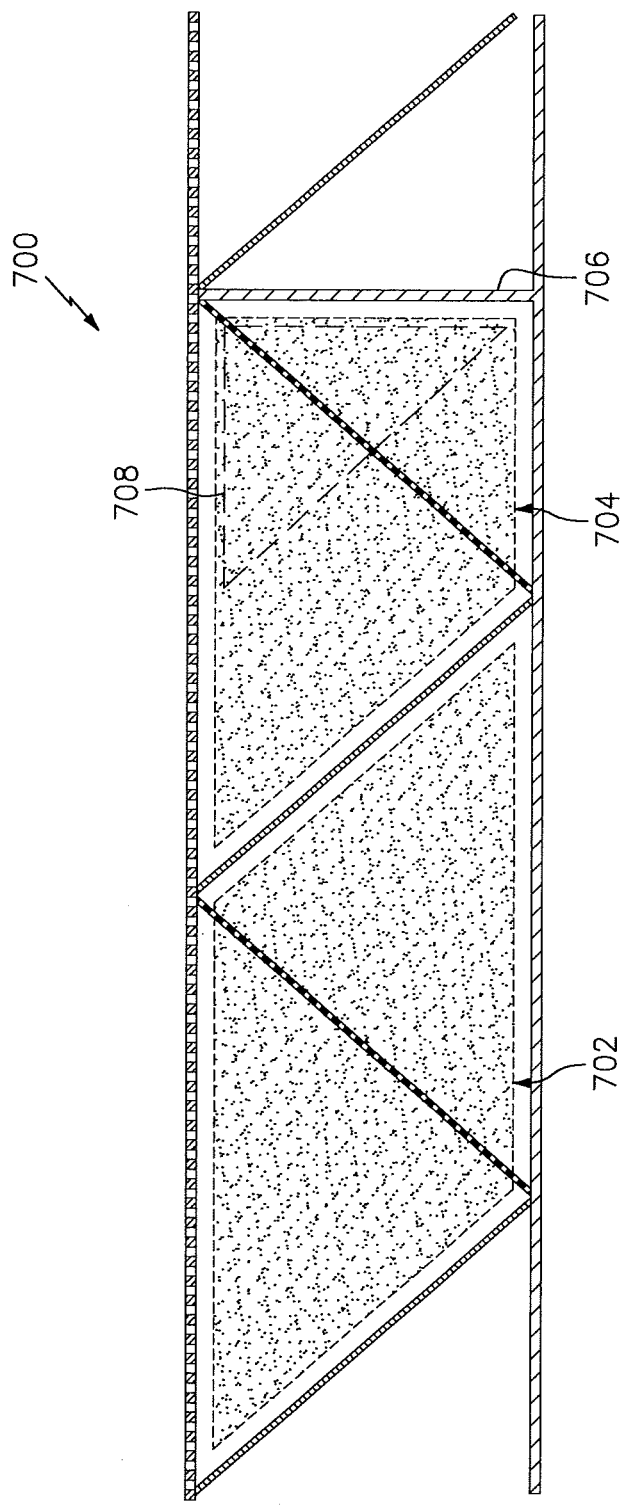
FIG. 7 is a sectional illustration of a portion of another acoustic panel with shaded areas showing cavities within its core.

Since the cavities 52A and 52B have at least substantially identical cross-sectional geometries as described above, the lengths of the corresponding resonance chambers are substantially the same even adjacent the stiffeners 50A. As a result, the end cavities 52B will have approximately the same sound attenuating operability as the intermediate cavities 52A. More particularly, the intermediate and the end cavities 52A and 52B may be operable to attenuate sound of approximately the same frequency. By contrast, the end and the intermediate cavities 702 and 704 of the panel 700 shown in FIG. 7 have different cross-sectional geometries. The configuration of the wall 706 of FIG. 7, in particular, shortens and changes the shape of the end cavity 704 as compared to the intermediate cavity 702. As a result, a portion 708 (e.g., half) of the end cavity 704 adjacent the wall 706 may become ineffective for attenuating sound of the desired lower frequency and, thus, may be effectively wasted.

Figure 8:
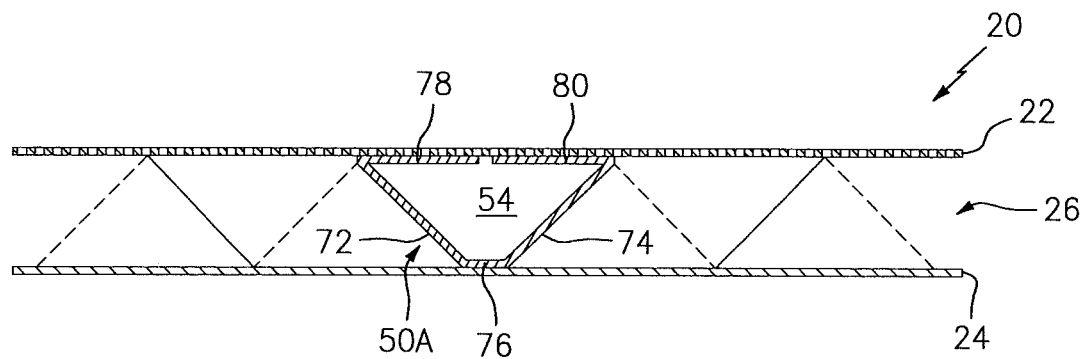
FIGS. 8-17 are sectional illustrations of portions of alternative acoustic panels taken in the x-z plane.
Figure 9:
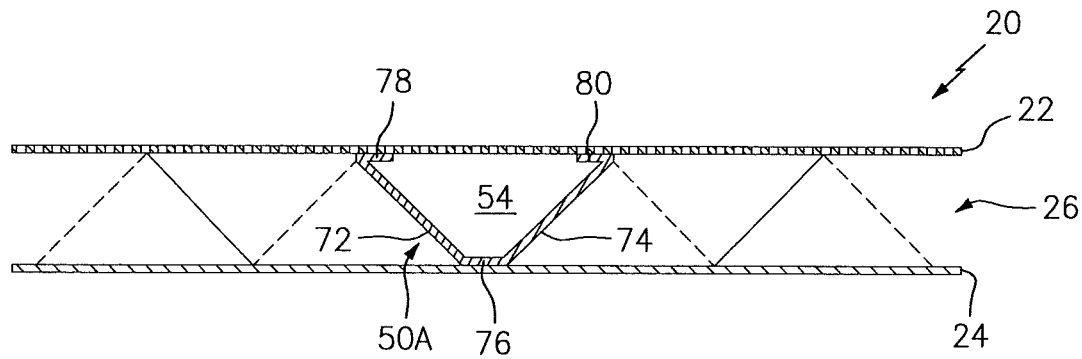
Figure 10:
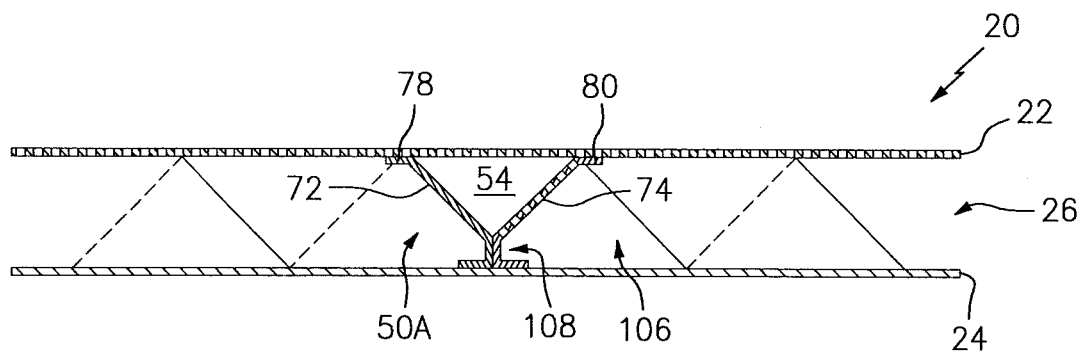
Figure 11:
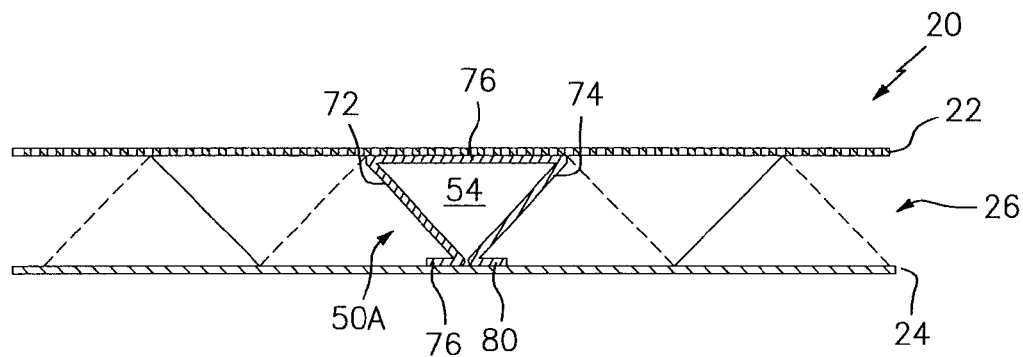
Figure 12:
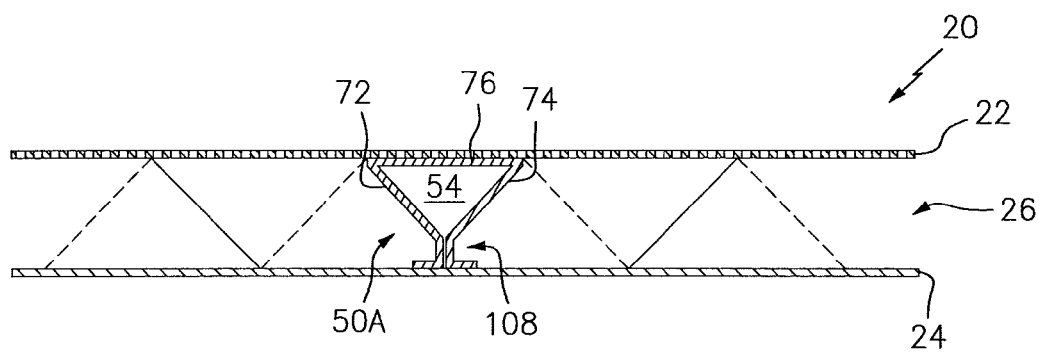
Figure 13:
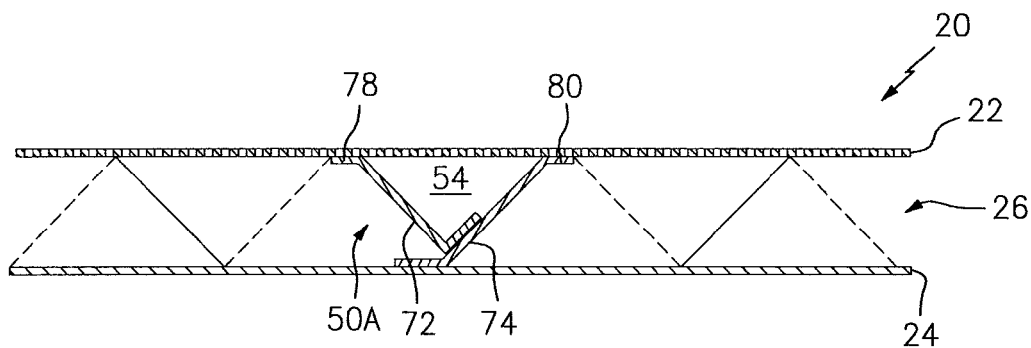
Figure 14:
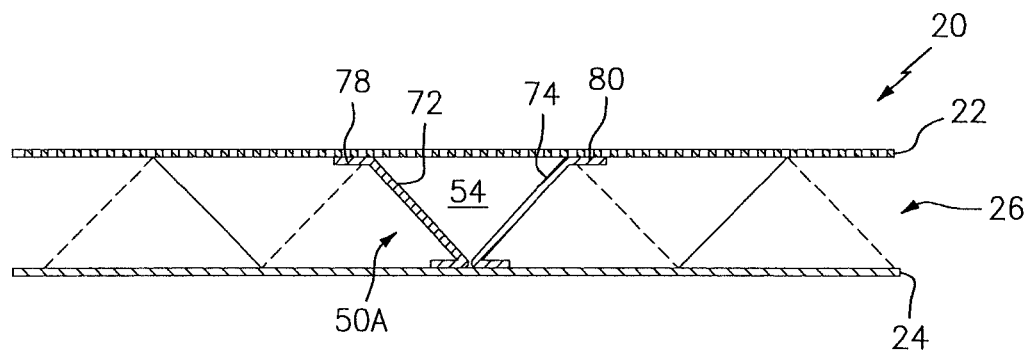
Figure 15:
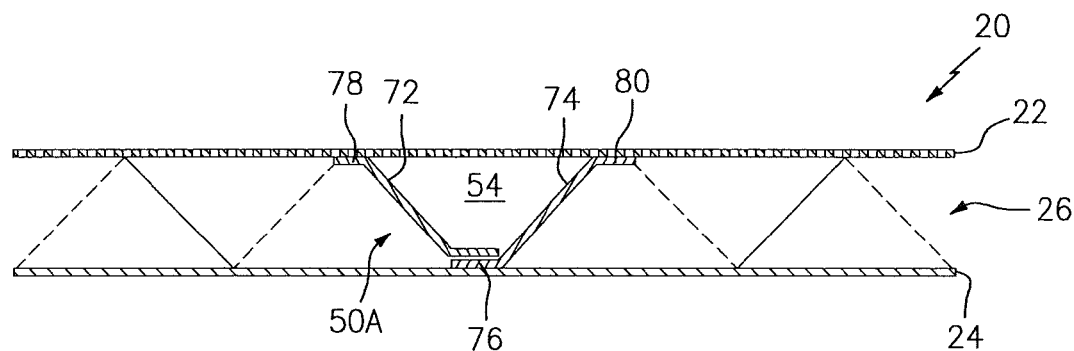
Figure 16:
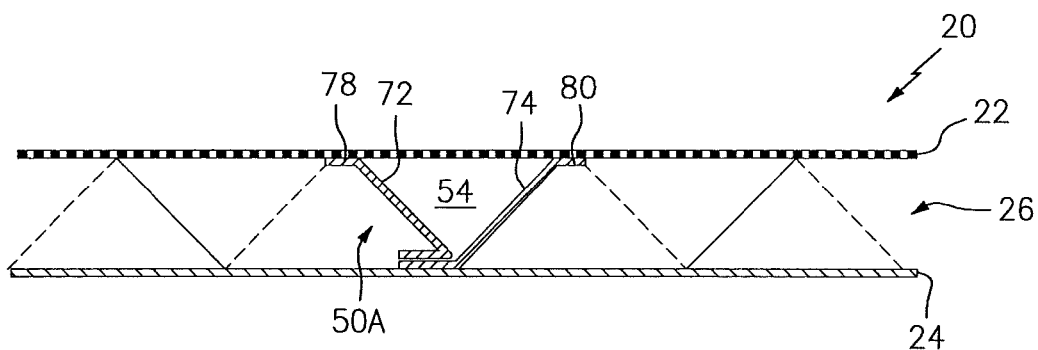
Figure 17:
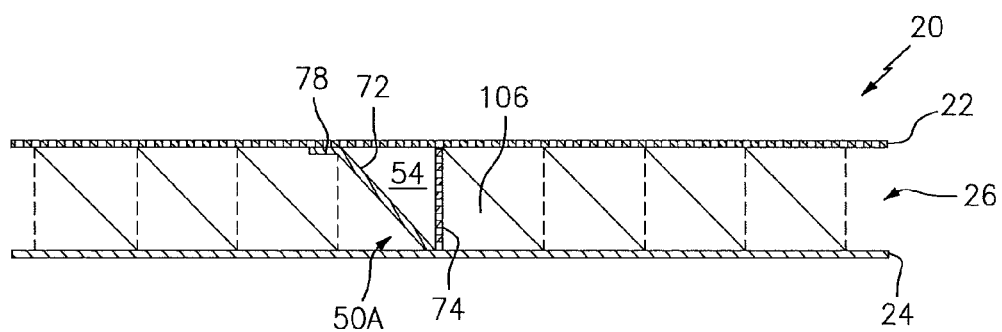

One or more of the stiffeners 50 may have configurations different from those described above and illustrated in FIGS. 2-6. For example, one or more of the stiffeners 50 may be configured as shown in FIGS. 8-17. In some embodiments, the cavity 54 within the stiffener 50 may be substantially fluidly isolated from the perforations 34 as shown in FIGS. 8, 11 and 12. In some embodiments, the cavity 54 within the stiffener 50 may be fluidly coupled with an adjacent cavity 106 as shown in FIGS. 10 and 17 through perforations 34 in the stiffener wall 74 (or 72); such perforations may also be applied to one or more of the other stiffener 50 configurations described herein. In such embodiments, the acoustic panel 20 may have substantially no wasted space for attenuating desired frequency noise. In some embodiments, each stiffener 50 may be formed as a unitary body as shown in FIGS. 2, 8, 9, 11, 12 and 17. In some embodiments, each stiffener 50 may be formed from a plurality of discrete segments as shown in FIGS. 10 and 13-16. In some embodiments, the bridge 76 may be connected to the second skin 24 as shown in FIGS. 2, 8 and 9. In some embodiments, the bridge 76 may be connected to the first skin 22 as shown in FIGS. 11 and 12. In some embodiments, one or more of the flanges 78, 80 may extend outwards from the stiffener 50 as shown in FIGS. 2 and 10-17. In some embodiments, one or more of the flanges 78, 80 may extend inwards as shown in FIGS. 8 and 9. In some embodiments, the stiffener 50 may include a vertical stem portion 108, which may provide the stiffener 50 with a generally Y-shaped cross-sectional geometry as shown in FIGS. 10 and 12. The present disclosure, of course, is not limited to the exemplary stiffener configurations described above and/or illustrated in the drawings.

In some embodiments, the acoustic core may be parasitic or only partially structural. In such embodiments, a network of one or more stiffeners may be included to provide most of the required structural integrity. These stiffener members can be configured to overcome any effective acoustic area loss which would otherwise impede the overall acoustic performance of the panels.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A panel for attenuating noise, comprising:
a first skin;
a second skin; and
a core including a first baffle, a second baffle, a first septum, a second septum and a stiffener, the core forming first and second cavities vertically between the first skin and the second skin, wherein the first and the second cavities are each fluidly coupled with perforations in the first skin;
the first cavity formed laterally between the first baffle and the second baffle and having a first cross-sectional geometry, wherein the first septum is laterally between the first baffle and the second baffle and divides the first cavity into fluidly coupled sub-cavities; and
the second cavity formed laterally between the second baffle and the stiffener and having a second cross-sectional geometry that is at least approximately identical to the first cross-sectional geometry, wherein the second septum is laterally between the second baffle and the stiffener and divides the second cavity into fluidly coupled sub-cavities.

2. The panel of claim 1, wherein
the second cavity is formed laterally between the second baffle and a wall of the stiffener;

the first baffle and the second baffle each have a first vertical stiffness; and the wall has a second vertical stiffness that is greater than the first vertical stiffness.

3. The panel of claim 1, wherein
the second cavity is formed laterally between the second baffle and a wall of the stiffener;
the first baffle and the second baffle each have a first thickness; and
the wall has a second thickness that is greater than the first thickness.

4. The panel of claim 1, wherein
the first baffle and the second baffle each comprises a first material; and
the stiffener comprises a second material that is different than the first material.

5. The panel of claim 4, wherein the first septum and the second septum each comprises the first material.

6. The panel of claim 1, wherein
the stiffener includes a first wall and a second wall;
the second cavity is formed laterally between the second baffle and the first wall; and
a third cavity is formed vertically between the first skin and the second skin and laterally between the first wall and the second wall.

7. The panel of claim 6, wherein the third cavity has a third cross-sectional geometry that is approximately identical to a cross-sectional geometry of at least one of the sub-cavities.

8. The panel of claim 6, wherein the third cavity is fluidly coupled with one or more perforations in the first skin.

9. The panel of claim 6, wherein
the second baffle is offset from the first skin by an acute first angle;
the first wall is offset from the first skin by an acute second angle that is substantially equal to the first angle;
the second septum is offset from the first skin by a third angle; and
the second wall is offset from the first skin by a fourth angle that is substantially equal to the third angle.

10. The panel of claim 9, wherein the third angle and fourth angle are acute angles.

11. The panel of claim 9, wherein the third angle and fourth angle are right angles.

12. The panel of claim 6, wherein one of the first wall and the second wall is perforated, and the other one of the first wall and the second wall is non-perforated.

13. The panel of claim 1, wherein
the core further includes a third baffle and a third septum;
a third cavity is formed vertically between the first skin and the second skin and laterally between the third baffle and the stiffener; and
the third cavity has a third cross-sectional geometry that is approximately identical to the first cross-sectional geometry; and
wherein the third septum is laterally between the third baffle and the stiffener and divides the third cavity into fluidly coupled sub-cavities.

14. The panel of claim 1, wherein the first baffle, the second baffle, the first septum, the second septum and the stiffener are each connected to and extend vertically between the first skin and the second skin.

15. A panel for attenuating noise, comprising:
a first skin;
a second skin, wherein one of the first skin and the second skin is perforated; and
a core comprising a corrugation and a stiffener and forming a plurality of cavities vertically between the first skin and the second skin, the corrugation including a first baffle and a first septum, and the stiffener including a first wall and a second wall;
a first of the cavities formed laterally between the first baffle and the first wall, wherein the first septum is laterally between the first baffle and the first wall and divides the first of the cavities into fluidly coupled sub-cavities; and
a second of the cavities formed laterally between the first wall and the second wall;
wherein the first baffle is connected to and offset from the first skin by an acute first angle, and the first wall is connected to and offset from the first skin by an acute second angle that is substantially equal to the first angle;
wherein the first septum is connected to and offset from the first skin by a third angle, and the second wall is connected to and offset from the first skin by a fourth angle that is substantially equal to the third angle; and
wherein a stiffness of the stiffener is greater than a stiffness of the corrugation.

16. The panel of claim 15, wherein
the first baffle has a first thickness; and
the first wall has a second thickness that is greater than the first thickness.

17. The panel of claim 15, wherein
the corrugation comprises a first material; and
the stiffener comprises a second material that is different than the first material.

18. The panel of claim 15, wherein the second of the cavities has a cross-sectional geometry that is approximately identical to a cross-sectional geometry of at least one of the sub-cavities.

19. The panel of claim 15, wherein
the core comprises a second corrugation including a second baffle and a second septum;
a third of the cavities formed laterally between the second baffle and the second wall, and the second septum is laterally between the second baffle and the second wall and divides the third of the cavities into fluidly coupled sub-cavities;
the second baffle is connected to and offset from the first skin by an acute fifth angle that is substantially equal to the first angle; and
the second septum is connected to and offset from the first skin by a sixth angle that is substantially equal to the third angle.

20. A panel for attenuating noise, comprising:
a first skin;
a second skin, wherein one of the first skin and the second skin is perforated; and
a core comprising a corrugation and a stiffener and forming a plurality of cavities vertically between the first skin and the second skin, the corrugation including a first baffle and a first septum, and the stiffener including a first wall and a second wall;
a first of the cavities formed laterally between the first baffle and the first wall, wherein the first septum is laterally between the first baffle and the first wall and divides the first of the cavities into fluidly coupled sub-cavities; and
a second of the cavities formed laterally between the first wall and the second wall;
wherein the first baffle is connected to and offset from the first skin by an acute first angle, and the first wall is connected to and offset from the first skin by an acute second angle that is substantially equal to the first angle;

wherein the first septum is connected to and offset from the first skin by a third angle, and the second wall is connected to and offset from the first skin by a fourth angle that is substantially equal to the third angle; and wherein the first baffle has a first thickness and the first wall has a second thickness that is greater than the first thickness.

21. The panel of claim 20, wherein the third angle and the fourth angle are each a right angle.

22. The panel of claim 15, wherein the fourth angle is different from the first angle.

23. The panel of claim 6, wherein the stiffener further includes a first flange; and the first flange projects out from an end of the first wall in a manner that is substantially parallel with the first skin and connects the first wall to the first skin.

24. The panel of claim 6, wherein the third cavity is not fluidly coupled with any perforations in the first skin.

\* \* \* \* \*